United States Patent
Grabowski

[15] 3,701,163
[45] Oct. 24, 1972

[54] MULTI-MODE, MONOPULSE FEED SYSTEM

[72] Inventor: Joseph P. Grabowski, Willingboro, N.J.

[73] Assignee: The United States of America as represented by the Secretary of the Navy

[22] Filed: Nov. 9, 1971

[21] Appl. No.: 196,925

[52] U.S. Cl. .....................343/786, 343/858, 333/6
[51] Int. Cl. ............................................H01q 13/00
[58] Field of Search ...343/777, 778, 786, 858; 333/6

[56] References Cited

UNITED STATES PATENTS 3,566,309    2/1971    Ajioka........................343/786

*Primary Examiner*—Eli Lieberman
*Attorney*—R. S. Sciascia et al.

[57] ABSTRACT

A wide band multi-mode feed device, capable of propagating a $TE_{10}$ and a hybrid shaping mode is provided. A narrow ridge hybrid mode generator, disposed between a mode cavity and a mode phasor, controls a sum pattern E-plane shaping mode. The narrow ridge provides only a negligible coupling to the $TE_{20}$ mode since the narrow ridges are placed only in the null regions of the $TE_{20}$ mode. The mode cavity and an inverse mode launcher control unwanted cross polarization resulting from the $TE_{11}$ and $TM_{11}$ modes. This device is most useful for high efficiency monopulse antenna systems and especially for systems where the accurate gathering and analysis of tracking data is a prime requisite.

9 Claims, 4 Drawing Figures

PATENTED OCT 24 1972 3,701,163

INVENTOR
JOSEPH P. GRABOWSKI

ATTORNEY

PATENTED OCT 24 1972

INVENTOR
JOSEPH P. GRABOWSKI

ATTORNEY

MULTI-MODE, MONOPULSE FEED SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Monopulse feed design generally utilizes four dominant horns to derive reference and error signals necessary for radar processing. When equal energy appears in each of the horns, the illuminating field is symmetrical about the antenna axis. If the target moves off the axis, the energy received in the four horns is unequal or unbalanced. The amount of target displacement can be obtained by examining the amount of the unbalanced energy.

Some systems, however, employ a single horn feed in lieu of the four mode horn. In this system, if an illuminating field on the horn is symmetrical about the axis, odd mode components go to zero and even mode components are at a maximum. As the field or target moves off the axis, the odd mode components are observed to exist and increase with the displacement of the field from the axis. Here, by using higher order waveguide modes in addition to the $TE_{1\,0}$ mode, monopulse sum and difference signals are obtained in the form of a sum E-field, E-plane error, and H-plane error. This system which is generally well known, requires special techniques for maintaining the separation of different E-plane and H-plane modes. U.S. Pat. No. 3,274,604 to B. L. Lewis, typifies a single horn monopulse feed system. Such a device however does not effectively provide low spillover loss for a wide bandwidth and operates with only one linear polarization plane. In fact, Lewis controls the relative phase and amplitude of the $TE_{1\,0}$ and $TM_{1\,0}$ mode over a very narrow bandwidth and is limited to either vertical or horizontal polarization plane.

Contemplating this instant invention, it has been found that spillover loss and side lobe level can be controlled by the combination of the $TE_{1\,0}$ mode and a hybrid mode designated as the $LSE_{1\,2}$. The $LSE_{1\,2}$ mode is a combination of the $TE_{1\,2} + TM_{1\,2}$ modes. To minimize spillover loss and side lobe level over a wide bandwidth the $TE_{1\,0}$ and he $LSE_{1\,2}$ must remain in phase with respect to each other throughout the waveguide. Until now, no such device has been able to maintain this relationship over a wide bandwidth as well as permit distinct modes on both horizontal and vertical polarization planes.

SUMMARY

A narrow ridge symmetrical mode generator for a monopulse feed system which is used to produce highly efficient sum node patterns over a wide bandwidth is contemplated. A hybrid mode ($LSE_{1\,2} = TE_{1\,2} + TM_{1\,2}$) is created in the waveguide by the use of a narrow ridge generator which causes a desired taper of the antenna illumination for each linear polarized E-plane. Without affecting the E-plane or H-plane error signals for either the vertical or the horizontal polarized planes or without causing undesirable cross-coupling between error signals, a desirable electromagnetic field shape is created when the hybrid mode is added to the $TE_{1\,0}$ mode. The reason for this is that the ridges are made to exist in the null regions of the $TE_{2\,0}$ mode and the cross-polarization resulting from any phase difference between the $TE_{1\,1}$ and $TM_{1\,1}$ modes may be corrected out of the system.

OBJECTS OF THE INVENTION

It is therefore an object of the present invention to simultaneously generate a highly efficient sum pattern and a highly efficient error pattern which are free from the deleterious effects of cross-polarization components.

Another object of the present invention is to provide separate and distinct modes on both linear polarization planes.

A further object of the invention is to maintain a bandwidth of 10 percent of the operating frequency.

Another object of the invention is to provide a multi-mode feed system with a high sum mode efficiency obtained from a circularly symmetric primary beam which is virtually free of side lobes.

A further object of the present invention is to suppress peak levels of cross-polarization patterns to better than approximately 20 db.

These and other objects and advantages will become more fully apparent to those skilled in the art from the following description taken in conjunction with the accompanying drawings in which like reference numbers refer to like parts throughout.

DRAWINGS

DETAILED DESCRIPTION

Figure 1:
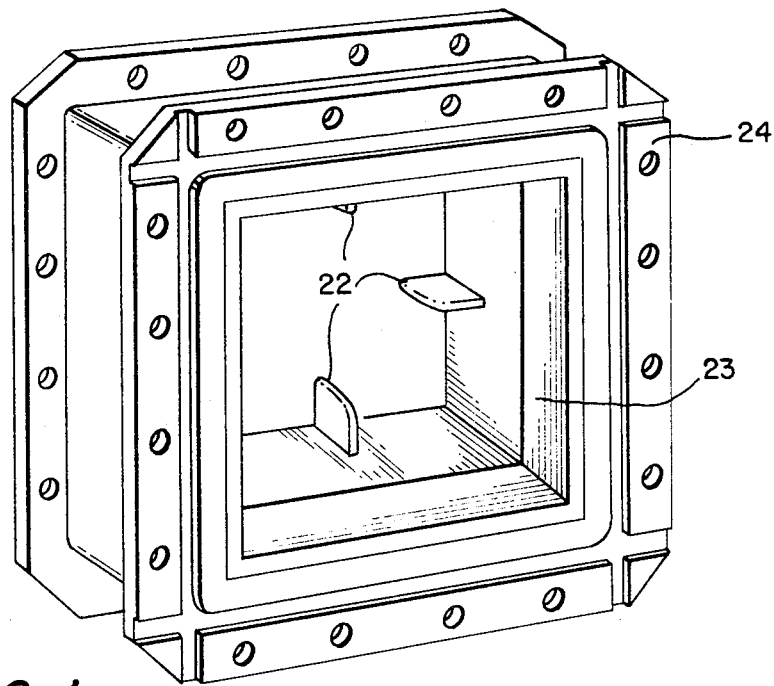
FIG. 1 is an isometric view of the narrow ridges contained in a typical waveguide structure.
Figure 2:
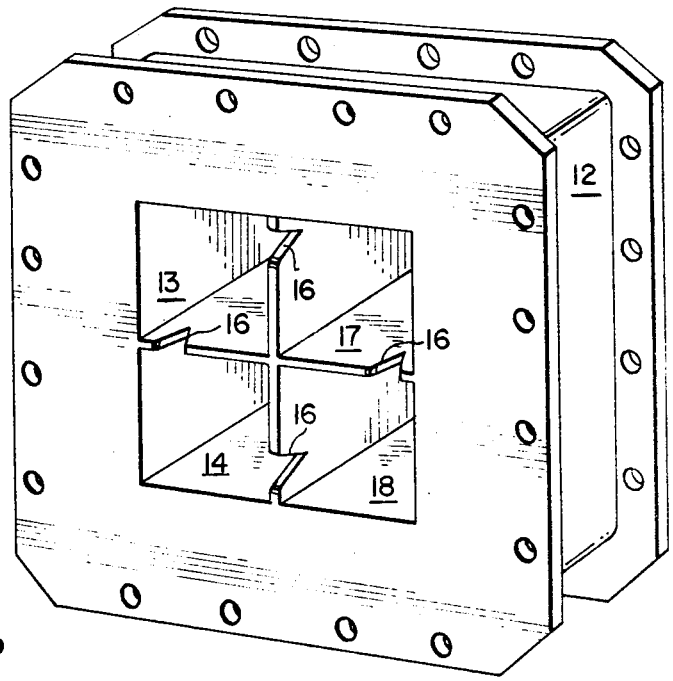
FIG. 2 is an isometric view of the inverse mode launching structure necessary to maintain proper mode amplitude relationships.
Figure 3:
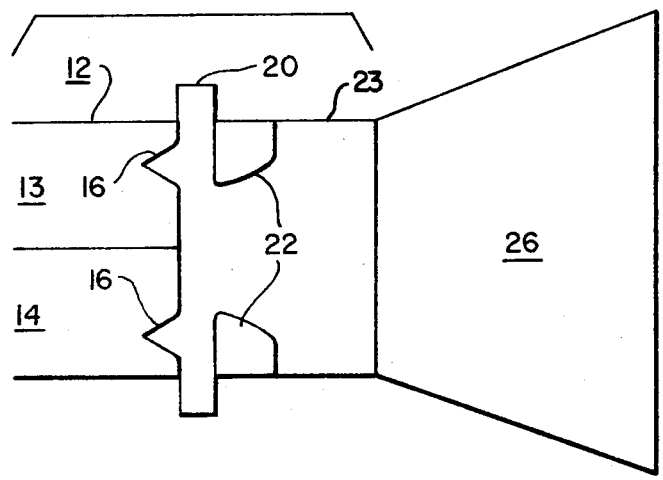
FIG. 3 is a plan schematic diagram of the mode generator and the feed horn.
Figure 4:
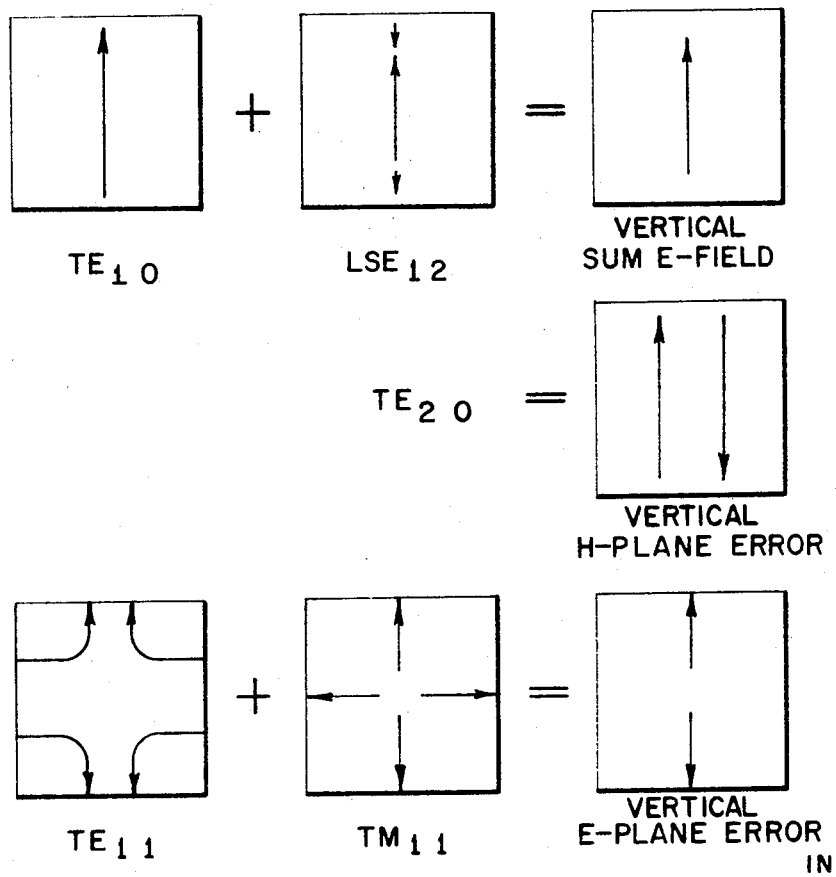
FIG. 4 is a graphical representation of the E-fields on the vertical polarization plane.

With reference to FIG. 2 and FIG. 3, equal energy is propagated through each of the four square waveguides 13, 14, 17 and 18, in four port comparator 12. The length of the mode phasor 23 to maintain a proper phase relationship between the $TE_{1\,0}$ and the $LSE_{1\,2}$, once the $LSE_{1\,2}$ mode has been created. The $LSE_{1\,2}$ and the $TE_{1\,0}$ modes must be in phase at the feed aperture 26 to achieve the desired sum E-field, as shown in FIG. 4. Thus the length of the mode phasor 23 is selected to achieve this relationship once it has been established. Unwanted cross polarized patterns will also be generated as a result of the narrow ridges 22 but can be tuned out by selecting the proper relative dimensions of the inverse mode launchers 16, which control the relative amplitude of the modes, and the mode cavity 20, which controls the relative phase. It has been found that the peak levels of the unwanted cross polarized patterns have been suppressed to better than 20 db. when these dimensions are properly selected. Hence, the feed can provide monopulse operation on both the vertical and horizontal polarization planes without any significant undesired coupling of the E-plane error signal of one polarization plane to the E-plane error signal of the other polarization plane.

Narrow ridges 22 are positioned between the mode cavity 20 and the mode phasor 23 and are responsible for generating the $LSE_{1\,2}$ mode. The location of the narrow ridges is important in that the $TE_{2\,0}$ mode (a desirable H-plane error signal), as shown in fIG. 4, can be propagated such that its null regions occur precisely at the narrow ridges 22. Since the narrow ridges 22 appear only at the null regions of the $TE_{2\,0}$ mode, only a negligible effect of the narrow ridge generator affects the $TE_{2\,0}$ mode. Hence, the narrow ridges cause no undesired affect on the H-plane error signal.

With specific reference to FIG. 4, assume for purposes of explanation that a pulse is transmitted by a monopulse radar system. The resultant signals issuing from the feed aperture 26 are vertically and horizontally polarized sum signals. The two sum signals will travel to and from a target in a typical radar manner. The returning information however is in the form of six separate and distinct signals comprising: horizontal and vertical sum signals, horizontal and vertical E-plane error, and horizontal and vertical H-plane error. FIG. 4 only shows the vertical signals, however the horizontal signals are merely turned 90°. The sum signals provide a reference phase for determining the direction sensed for the error signals to the target. The vertical E-plane error provides elevational information while the vertical H-plane error provides azimuth information. The importance of maintaining these signals in separate and distinct form, as has herein been accomplished and explained, is readily apparent.

As an example of the typical hardware dimensions which produce effective mode relationships over a wide bandwidth, I have found the following dimensions particularly advantageous when operating at 5.4–5.9 GHz:

The inverse mode launching means 16 are cut in the form of a "V" with each center 0.35 inches from its respective side. The "V" extends 0.4 inches into the guide and has a 0.4 inch cross length at the top of the "V";

The mode cavity 20 has a length of 0.206 inches and a square cross-section of 3.065 inches;

The narrow ridge generator which has a rounded taper has an increasingly circular cross-section and length of 0.500 inches;

The mode phasor 23 has a length of 3.0 inches with a square cross-section of 2.625 inches.

The above dimensions are applicable to a structure capable of simultaneously propagating horizontal and vertical polarization. Although only the vertical polarization pattern has been described above, it should be apparent to those skilled in the art that a discussion of the horizontal polarization patterns is not needed since the same theory applies to the distinct modes on the horizontal polarized plane as well because the waveguide is symmetrical (square).

The preferred embodiment of this invention has been illustrated and described and it is understood that other embodiments may be devised which would fall within the scope of the invention which is defined by the attached claims.

What is claimed and desired to be secured by letters patent of the United States is:

1. A wide band multi-mode feed device capable of propagating a $TE_{1\,0}$, and a $LSE_{1\,2}$ mode comprising:
   inverse mode launching means for controlling the relative amplitude of an existing $TE_{1\,1} + TM_{1\,1}$ mode;
   mode cavity means connected to said inverse mode launching means for minimizing a relative phase difference between said $Te_{1\,1} + TM_{1\,1}$;
   narrow ridge generator means connected to said mode cavity means for generating an E-plane shaping mode $LSE_{1\,2}$; and
   mode phasor means connected to said narrow ridge generator means for simultaneously propagating and phasing the $TE_{1\,0}$ mode and the $LSE_{1\,2}$ mode.

2. The feed devices claimed in claim 1 wherein the narrow ridge generator means tapers an E-plane aperture distribution when the $LSE_{1\,2}$ mode is combined with the $TE_{1\,0}$ mode.

3. The feed devices claimed in claim 1 wherein the inverse mode launching means are disposed between said mode cavity and a four port comparator.

4. The feed devices claimed in claim 1 wherein the narrow ridge generator means are disposed in a position where a $TE_{2\,0}$ mode experiences a null.

5. A wide band multi-mode feed generator capable of operating between 5.4 and 5.9 giga Hz comprising:
   a four port comparator capable of at least propagating the $TE_{10}$ modes;
   inverse mode launching means in the form of a "V" cut into each port of the four port comparator;
   mode cavity means having two ports, a first port being contiguous with said inverse mode launching means;
   narrow ridge generator means having two ports, a first port connected to the second port of said mode cavity means; and
   mode phasor means having two ports, a first port connected to the second port of said narrow ridge generator means.

6. The wide band multi-mode feed device as claimed in claim 5, wherein:
   the "V" has a dimension of approximately 0.4 in. deep and 0.4 in. wide at the top.

7. The wide band multi-mode feed device as claimed in claim 5, wherein:
   the mode cavity means is approximately 0.206 in. between ports and has a square opening of 3.065 inches.

8. The wide band multi-mode feed device as claimed in claim 5, wherein:
   the narrow ridge generator means has an increasing circular cross-section between the ports and the distance between the ports is approximately 0.500 inches.

9. The wide band multi-mode feed device as claimed in claim 5, wherein:
   the mode phasor means has a square cross-section of approximately 2.625 inches and a distance of 3.0 inches between the ports.

* * * * *